UNITED STATES PATENT OFFICE.

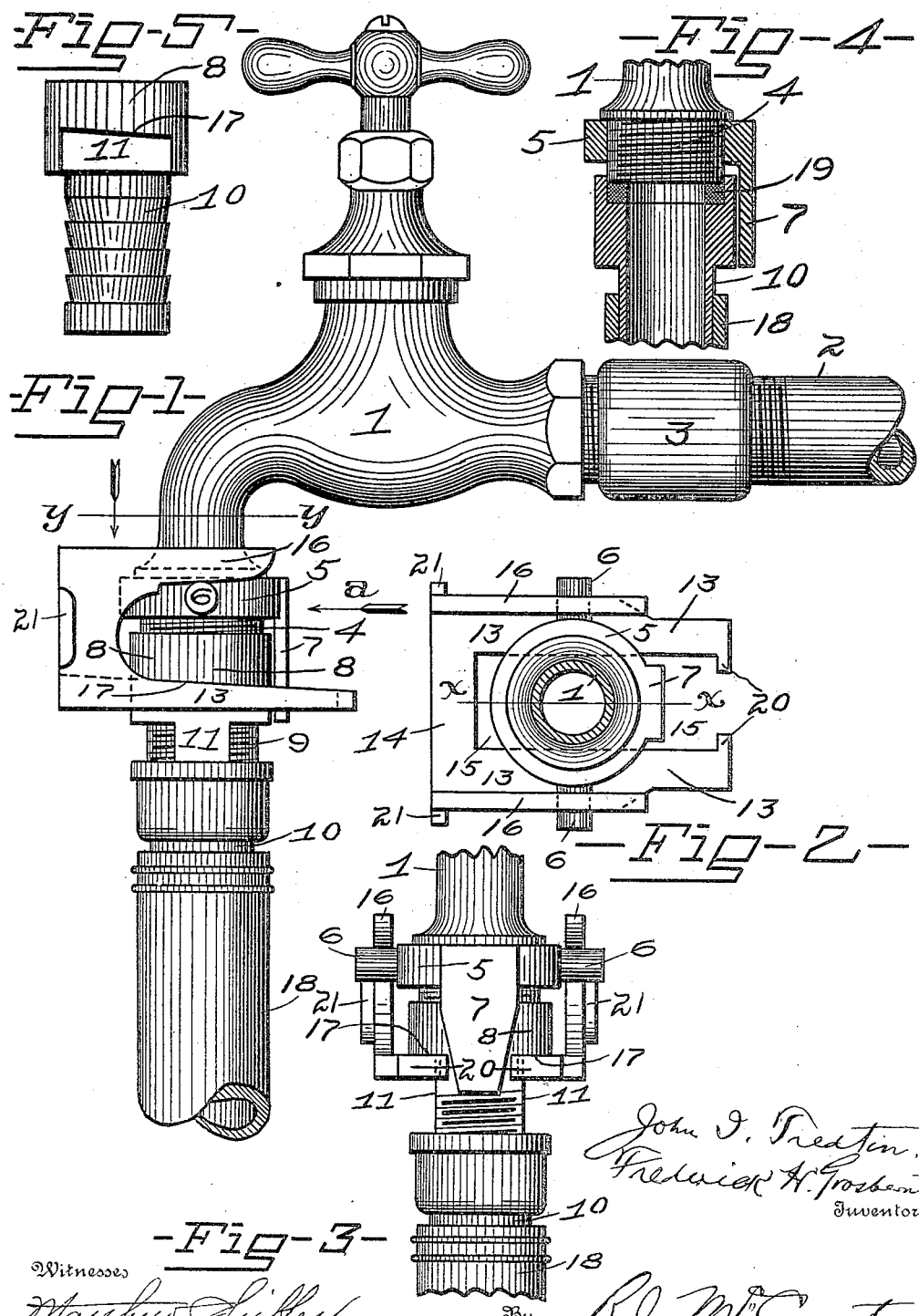

JOHN I. TREDTIN AND FREDERICK H. GROSBERNT, OF DAYTON, OHIO.

HOSE COUPLING OR CONNECTOR.

No. 817,818.     Specification of Letters Patent.     Patented April 17, 1906.

Application filed September 25, 1905. Serial No. 279,876.

*To all whom it may concern:*

Be it known that we, JOHN I. TREDTIN and FREDERICK H. GROSBERNT, citizens of the United States, residing at Dayton, in the county of Montgomery and State of Ohio, have invented certain new and useful Improvements in Hose Couplers or Connectors; and we do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements in couplings or connectors for hose and faucets.

The object of the invention is to provide a simple and effective connector for readily connecting or coupling hose to faucets, such means being easily manipulated to effect a most rigid connection.

The connector is entirely free from screws or other parts liable to be lost or misplaced. The parts of the connector besides being free from screws are permanently connected with the hose, on the one hand, and the faucet, on the other.

Preceding a detail description of the invention reference is made to the accompanying drawings, of which—

Figure 1 is a side elevation of a faucet, showing our improved connector in position thereon. Fig. 2 is a view on the line *y y* of Fig. 1 looking in the direction of the arrow. Fig. 3 is a view looking in the direction of the arrow *a* in Fig. 1. Fig. 4 is a sectional view on the line *x x* of Fig. 2. Fig. 5 is a detached view of the hose-tube, the same containing modifications in construction which render its use without the common form of hose-tube.

In a detail description of the invention similar reference characters indicate corresponding parts.

1 designates the usual faucet, having a connection with a service-pipe 2 through means of a common form of union 3. The neck or discharge end of the faucet is provided, as usual, with exterior screw-threads 4. Engaging these screw-threads 4 is a ring 5, which screws against the flange on the discharge end of the faucet. From opposite sides of this ring 5 project trunnions 6, and from the lower or rear side of said ring a plate 7 laterally projects and serves as a stop to facilitate the operations of coupling.

8 designates a nipple or coupling-piece which has a screw-threaded extension 9, that engages the hose-tube 10 by being screwed into the same. Opposite sides of the nipple 8 are flat, as at 11, and shoulders 17 are thus formed on said nipple, which slightly taper from one end to the other of said shoulders. The object and purpose of these tapered shoulders is to form a wedge-like engagement with a coupling-frame to be presently described. The screw-threaded end 4 of the faucet projects into the nipple 8 and engages a gasket 19 within said nipple; but the said screw-threaded end 4, it will be understood, has no screw-threaded connection with the nipple 8. On the contrary, it is forced in rigid contact with the gasket 19 by means presently described, consisting of the frame hereinbefore referred to. This means consists of a coupling-frame consisting of lower and upper arms 13 13 and 16 16, which are joined by an integral cross-plate 14 and in which is provided an oblong rectangular opening 15, that receives the nipple 8. The upper arms 16 16 engage the trunnions 6 on the ring 5, while the lower arms 13 13 engage the opposite surface 11 of the nipple, and the shoulders 17, which, as before stated, are tapered.

The upper sides of the arms 13 13, it will be seen from Fig. 1, slightly taper in a direction opposite the taper of the shoulders 17, and thus a wedge-like engagement occurs between these parts when the coupling-frame is forced in contact with the nipple. The coupling-frame is connected by hand, sufficient force being thus applied to rigidly draw the gasket 19 in contact with the end of the faucet, as shown in Fig. 4.

It will be seen that the upper arms 16 16 of the frame engage the trunnions 6 on the ring 5. The engaging surfaces of these parts 16 16 may also taper similar to the lower arms 13 13, and it will be clearly understood that in pressing the coupling-frame in engagement with the trunnions 6 and the shoulders 17 the parts become wedged together in a most rigid manner.

In Fig. 1 a common form of hose-tube 10 is shown as a means for connecting the hose 18 with the faucet, and this figure illustrates that our improved connector may be utilized for connecting any hose having this common form of hose-tube 10 with the faucet. In this case the nipple 8 is screwed into the hose-tube 10 and is allowed to so remain, and the ring 5 is allowed to remain permanently connected with the faucet, so that all that is necessary in making the connection is to bring the nipple 8 in contact with the end of the faucet and apply the coupling-frame in a manner hereinbefore described. In making the connection the part 7 of the ring 5 acts as a stop to center the nipple 8 and the end of the faucet.

Fig. 5 shows a form of hose-tube 10 which combines in one piece the nipple 8, so that the common form of hose-tube shown in Fig. 1 may be dispensed with, and the nipple 8 serves the purpose of a connection directly with the hose 18 and directly with the end of the faucet. The construction of the nipple as shown in Fig. 5 is otherwise the same, having the flat sides 11 and the shoulders 17, and it is further provided with the gasket 19, against which the end of the faucet engages. The coupling-frame is not detachable from the nipple 8 after it is placed in connection therewith. It will therefore be seen that there is no danger of said coupling-frame becoming lost or misplaced. When the said frame is placed on the nipple 8, the rear ends of the arms 13 13 are bent inwardly, as at 20, to decrease the area of the entrance to the space 15, which is occupied by the nipple, and which nipple is thereby prevented from becoming disconnected or detached from said coupling-frame.

Having described our invention, we claim—

1. In a hose-connector, the combination with a faucet, of a nipple having two tapering shoulders disposed on opposite sides of said nipple, a coupling-frame having parallel arms with inner tapering sides, two of said arms engaging the shoulders on the nipple, and means on opposite sides of the faucet engaged by the tapering surfaces of the other of said parallel arms, and whereby the nipple is clamped to the faucet, substantially as specified.

2. In a connector, a ring attachable to the discharge end of a faucet, said ring having trunnions projected from opposite sides, a nipple attachable to the hose, said nipple having shoulders on opposite sides, and a coupling-frame engaging said shoulders, and said trunnions on said ring, whereby the nipple is forced in rigid contact with the end of the faucet, substantially as set forth.

3. In a connector, a trunnion member attachable to the mouth of the faucet, a nipple attachable to the hose, said nipple having on opposite sides flat surfaces terminating in tapering shoulders, and an open frame having four projecting parts which are adapted to engage respectively, the trunnions on said trunion member, and the shoulders on said nipple, and whereby wedge-like means are provided for forcing the nipple rigidly against the end of the faucet, substantially as specified.

In testimony whereof we affix our signatures in presence of two witnesses.

JOHN I. TREDTIN.
FRED. H. GROSBERNT.

Witnesses:
R. J. McCARTY,
C. M. THEOBOLD.